(12) United States Patent
Peterson

(10) Patent No.: US 7,150,300 B1
(45) Date of Patent: Dec. 19, 2006

(54) DISC-TYPE STUMP GRINDER

(75) Inventor: Dale R Peterson, Hancock, MI (US)

(73) Assignee: Bay Engineering, Inc., Calumet, MI (US)

( * ) Notice: Subject to any disclaimer, the term of this patent is extended or adjusted under 35 U.S.C. 154(b) by 193 days.

(21) Appl. No.: 10/669,109

(22) Filed: Sep. 23, 2003

(51) Int. Cl.
A01G 23/06 (2006.01)

(52) U.S. Cl. .................................. 144/24.12; 144/4.1

(58) Field of Classification Search ............. 144/24.12, 144/218, 220, 176, 4.1, 34.1; 241/101.71, 241/101.72, 107.74, 101.75; 37/302
See application file for complete search history.

(56) References Cited

U.S. PATENT DOCUMENTS

| | | |
|---|---|---|
| 1,467,430 A | 9/1923 | Hurd |
| 1,646,812 A | 10/1927 | Davey et al. |
| 2,426,382 A | 8/1947 | Wilson ..................... 29/105 |
| 2,887,134 A | 5/1959 | Bartlett ........................ 144/2 |
| 2,927,613 A | 3/1960 | Franzen et al. ............... 144/2 |
| 2,992,664 A | 7/1961 | Shano ....................... 144/235 |
| 3,123,112 A | 3/1964 | Hodges et al. ................ 144/2 |
| 3,732,905 A | 5/1973 | Pickel ....................... 144/2 Z |
| 3,797,544 A * | 3/1974 | Ver Ploeg ................... 144/235 |
| 3,818,957 A | 6/1974 | Schoonover ............... 144/34 R |
| 3,911,979 A | 10/1975 | Rousseau ................... 144/2 N |
| 4,530,385 A | 7/1985 | York ......................... 144/2 N |
| 4,621,668 A | 11/1986 | York ......................... 144/3 K |
| 4,681,145 A | 7/1987 | York ......................... 144/2 N |
| 4,709,736 A | 12/1987 | Bellars ...................... 144/2 N |
| 5,115,845 A | 5/1992 | Hooser ...................... 144/2 N |
| 5,203,388 A * | 4/1993 | Bowling ................... 144/24.12 |
| 5,435,359 A | 7/1995 | Craft .......................... 144/334 |
| 5,655,581 A | 8/1997 | Craft ........................ 144/24.12 |
| 5,829,497 A * | 11/1998 | Maroney ................. 144/24.12 |
| 5,887,634 A | 3/1999 | Theisen ...................... 144/334 |
| 5,996,657 A | 12/1999 | Riesselman ................. 144/235 |
| 6,021,825 A | 2/2000 | Bowling ................... 144/24.12 |
| 6,047,749 A | 4/2000 | Lamb ...................... 144/24.12 |
| 6,263,930 B1 | 7/2001 | Wiley ..................... 144/24.12 |

(Continued)

FOREIGN PATENT DOCUMENTS

GB        7465        11/1837

(Continued)

OTHER PUBLICATIONS

Brochure-Are you stumped? Going! Going! Gone!!! Get un-stumped with the Stumpster Co., Houston, Texas (Stumpster Model 1001-3).
Tractor Installation Manual-ARPS Stump Master (Models JO0 & JO1 and KITS JO5 & JO6), ARPS Corporation, New Holstein, Wisconsin.

(Continued)

Primary Examiner—Lowell A. Larson
Assistant Examiner—Shelley Self
(74) Attorney, Agent, or Firm—Van Dyke, Gardner, Linn & Burkhart, LLP

(57) ABSTRACT

A stump grinding machine for cutting and grinding a stump in the ground includes a mounting frame attachable to a powered vehicle and is a disc mount that is pivotally mounted to the mounting frame. The disc mount rotatably mounts or supports a grinding disc, such that the grinding disc may be pivoted about a generally horizontal pivot axis to move a face of the grinding disc into engagement with the stump to cut and grind the stump. The grinding disc may include a plurality of depth guides for limiting the depth of cut of teeth or blades on the face of the grinding disc. The support frame may be entirely supported at the powered vehicle, such that no support arms or legs or outriggers are positioned at an outer end of the support frame to support the grinding disc above the ground.

28 Claims, 10 Drawing Sheets

U.S. PATENT DOCUMENTS 6,382,277 B1    5/2002    Paumier et al. ............. 144/235
6,435,234 B1    8/2002    Paumier ................. 144/24.12

FOREIGN PATENT DOCUMENTS

SU          803907      2/1981    ............. 144/24.12

OTHER PUBLICATIONS

Operation and Parts Manual-ARPS Stump Master (Models J00 & J01), ARPS Corporation, New Holstein, Wisconsin.
Brochure-New ARPS Stump Master—hydraulically operated stump cutter, ARPS Corporation, New Holstein, Wisconsin.
Brochure-Border City Tool Carbide Tipped Stump Cutters, Border City Tool and Manufacturing Co., Warren, Michigan.

* cited by examiner

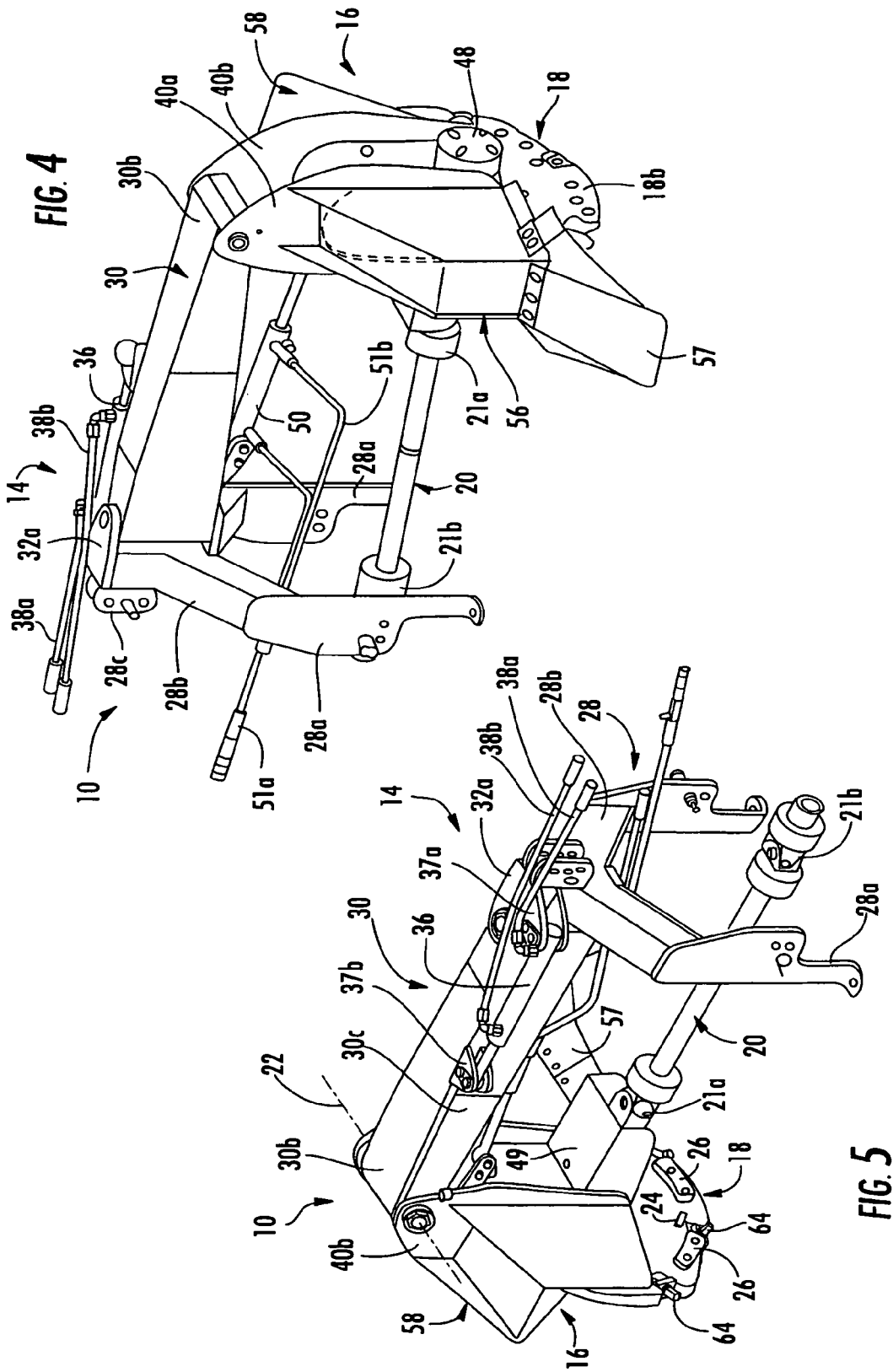

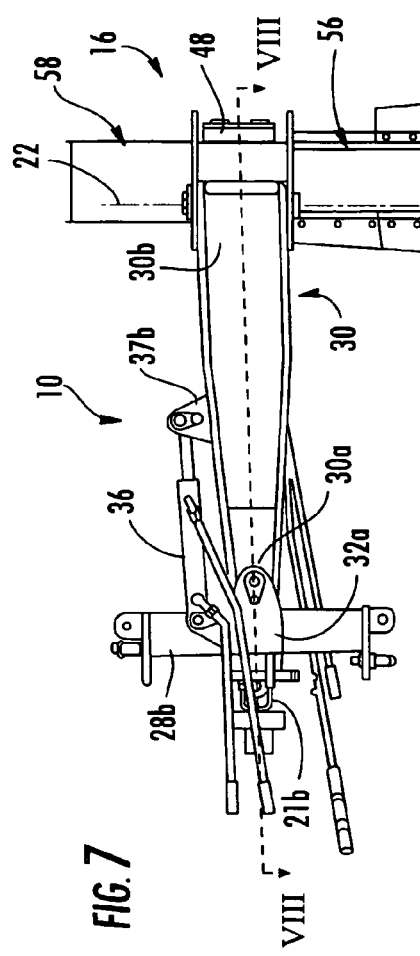
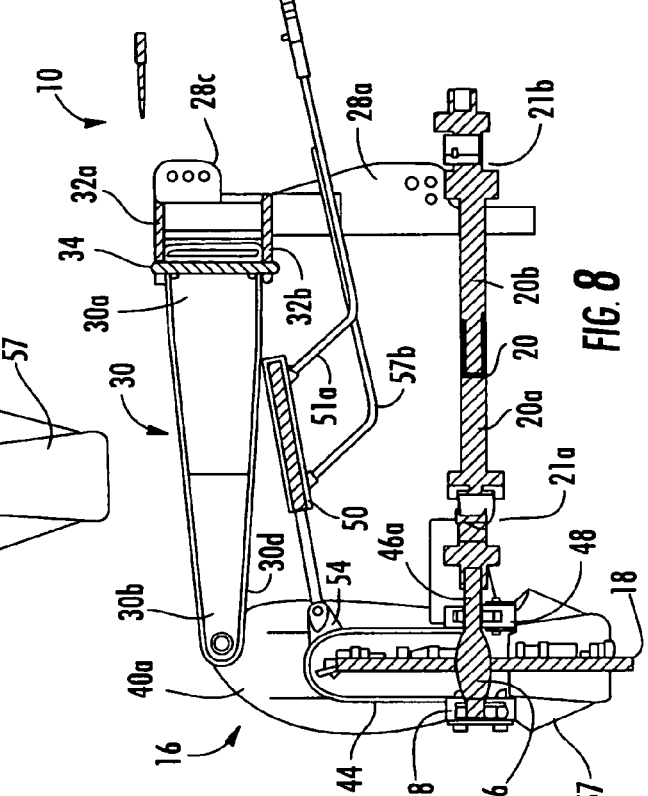
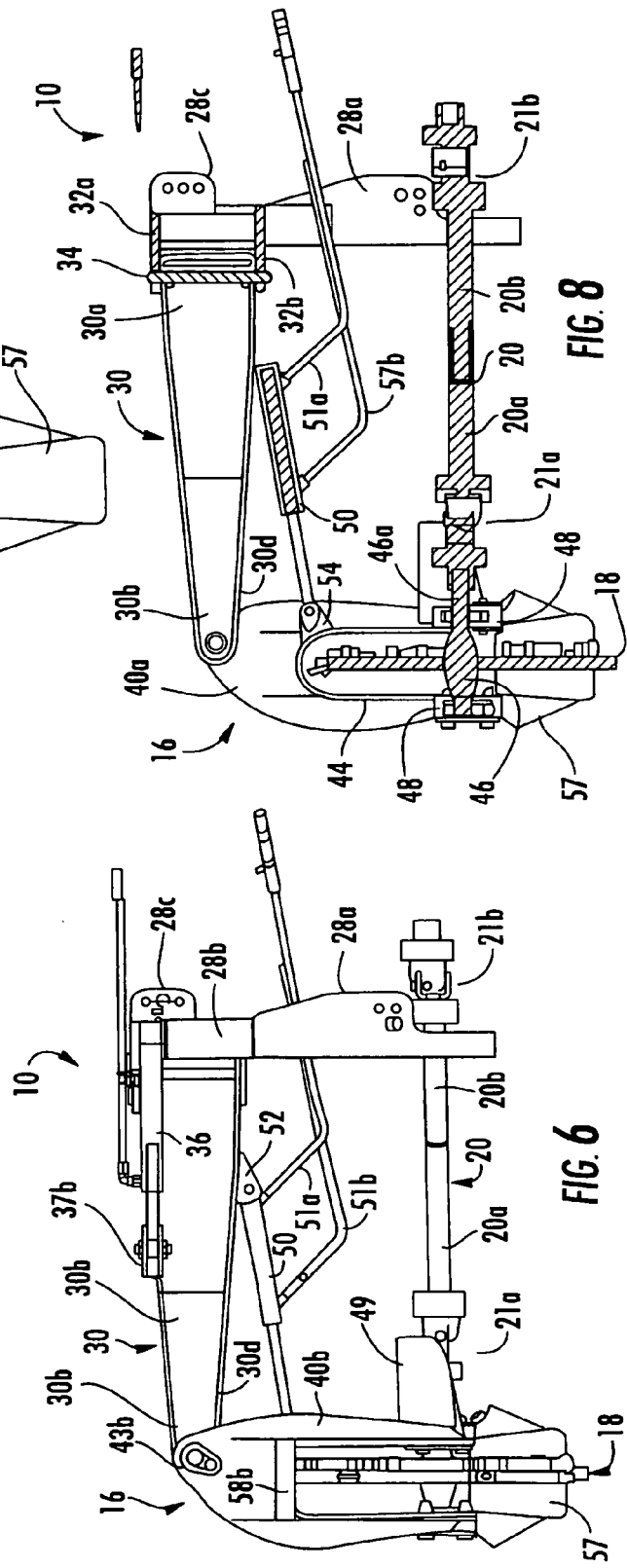
FIG. 7
FIG. 8
FIG. 6

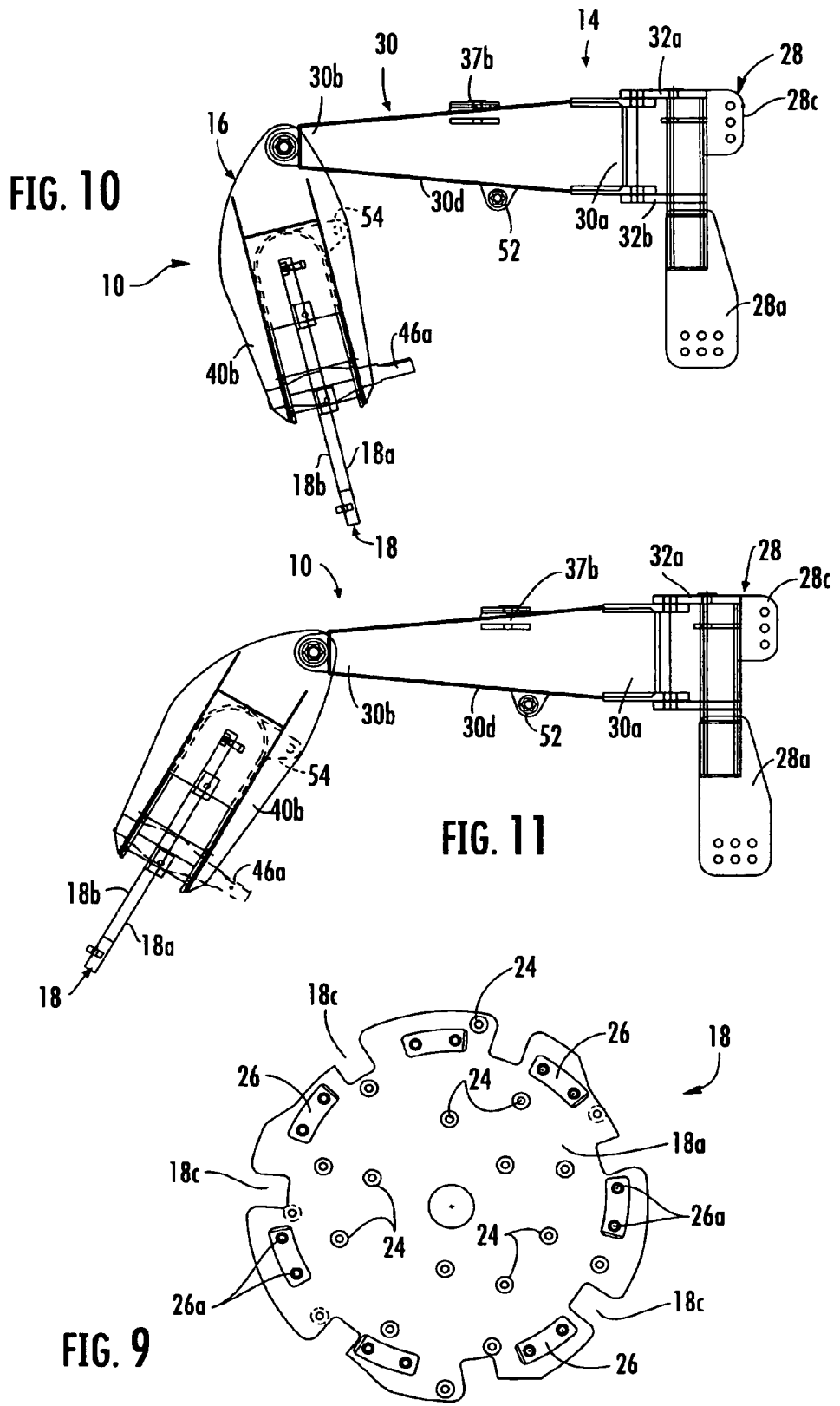

DISC-TYPE STUMP GRINDER

FIELD OF THE INVENTION

The present invention is related generally to stump grinders or cutters that cut or grind stumps left in the ground after a tree has been cut down and, more particularly, to a disc type stump grinder that grinds the stump via blades or cutting tools arranged on a face and/or a circumferential edge of a grinding disc.

BACKGROUND OF THE INVENTION

It is known to provide a stump cutting or grinding device with a cutting or grinding disc that has a plurality of blades or cutting tools positioned thereon for engaging and cutting or grinding a stump or the like after a tree has been cut down. The stump cutting or grinding devices may be mounted to a tractor and may be driven via a power takeoff from the tractor's engine, such that operation of the tractor's engine causes rotation of the cutting disc. The stump cutting or grinding disc may have a plurality of teeth disposed along a perimeter edge of the cutting disc, whereby the disc may be moved generally vertically downward or in a direction generally transverse to its axis of rotation to cut downwardly into and through the stump. The disc may then make multiple such downward cuts to substantially cut or grind the stump away. It is also known to provide a stump grinding disc that has a plurality of cutting tools or blades or teeth disposed along a face of the disc, whereby the disc may be moved or drawn horizontally into and through the stump to cut and grind the stump. However, such stump grinding devices are typically difficult to control and stabilize due to the blades or teeth of the grinding disc engaging and over cutting a substantial depth into the stump as the disc is rotated. Such over cutting causes difficulties in controlling the cutting disc and in stabilizing the cutting device, such that additional stabilizers or support feet or arms or outriggers are required to stabilize the outer end of the cutting or grinding device away from the tractor.

Accordingly, there is a need in the art for a stump cutting or grinding device that overcomes the shortcomings of the prior art.

SUMMARY OF THE INVENTION

The present invention provides a stump grinding device or machine that controls the cutting of the cutting disc to enhance the stability of the grinding device, such that outer support arms or feet or outriggers are not required to support the grinding or cutting disc during operation of the stump grinding device of the present invention. The stump grinding device pivotally mounts the stump grinding disc to a support arm of the device, such that the grinding disc may be pivotally or arcuately moved to cut or grind the stump. One or more arcuate passes through the stump thus may be performed to substantially cut and grind the stump.

According to an aspect of the present invention, a stump grinding machine is configured to mount to a powered vehicle, such as a powered tractor or a powered skid steer or the like, and is operable to grind a stump. The stump grinding machine comprises a disc mount pivotally mounted to an end of a mounting portion of the powered vehicle and pivotable about a generally horizontal axis, and a grinding disc rotatably mounted to the disc mount. The grinding disc has a plurality of grinding teeth arranged on and extending from a face of the disc, such as a front face of the disc that is facing generally toward the powered vehicle or a rear face of the disc that is facing generally away from the powered vehicle. The grinding disc is rotatably drivable by a rotational drive device connected to the grinding disc and to a power source of the powered vehicle. The disc mount is pivotable about the generally horizontal axis to arcuately move the grinding disc as the grinding disc is rotatably driven by the power source to grind a stump.

Optionally, the rotational drive device may comprise a telescopic drive shaft connected between a power takeoff of the vehicle and the grinding disc. The telescopic drive shaft may be angularly adjusted and may be lengthwise adjusted to accommodate the pivotal or arcuate movement of the grinding disc as the disc mount is swung or moved about the horizontal axis. Optionally, the rotational drive device may comprise a hydraulic motor that is secured to the disc mount and connected to or in fluid communication with a hydraulic pump system of the vehicle.

The stump grinding machine may include a mounting frame configured to connect to the mounting portion of the powered vehicle and to extend generally horizontally therefrom. The mounting frame may be configured to be cantileverly supported at the powered vehicle, such that the mounting frame and the disc mount may be entirely supportable at the powered vehicle. The mounting frame may include a base portion attachable to the powered vehicle and a support portion or support arm mounted at one end to the base portion and extending generally horizontally from the base portion. The disc mount may be pivotally attached to an opposite end of the support portion or arm from the base portion. The support portion or arm may be pivotally mounted to the base portion and may be pivotable about a generally vertical axis to facilitate side to side arcuate movement of the disc mount relative to the powered vehicle.

The disc mount may be pivotally mounted to the mounting portion of a support arm extending from the powered vehicle. The disc mount may comprise a housing or cover or shroud portion that houses the grinding disc and a mounting bracket that may be pivotally mounted to the mounting portion of the support arm of the powered vehicle. The shroud portion may be pivotally mounted to the mounting bracket and may be pivotable about a second generally horizontal axis.

The disc mount may be biased toward an initial orientation. The disc mount may pivot about the horizontal axis away from the initial orientation in response to the grinding disc being moved into engagement with a stump via movement of the vehicle relative to the stump. The disc mount may be biased to urge the grinding disc into and at least partially through the stump to grind the stump after the vehicle is stopped.

According to another aspect of the present invention, a stump grinding machine is configured to mount to a powered vehicle and is operable to grind a stump. The stump grinding machine comprises a mounting frame configured to connect to the powered vehicle and to extend generally outwardly therefrom, a disc mount supported at the mounting frame, and a grinding disc rotatably mounted to the disc mount. The mounting frame extends outwardly from the powered vehicle and is supported entirely at the powered vehicle. The grinding disc has a plurality of grinding teeth on a face of the disc, such as the front face of the disc that is facing generally toward the powered vehicle. The grinding disc is rotatably drivable by a rotational drive device connected to the grinding disc and to a power source of the powered vehicle. The grinding disc includes a plurality of depth guides positioned on the face of the grinding disc. The depth guides limit the depth of cut of the grinding teeth as the grinding disc is rotated and engaged with a stump.

The depth guides may comprise blocks spaced along a radial path on the face of the grinding disc. The depth guides may be adjustably mounted to the grinding disc to adjust a depth of cut of the grinding teeth. The depth guides may be adjustably mounted via at least one shim or plate that is removably positioned between a respective depth guide and the face of the grinding disc. The depth guide may include a cutting edge along the forward edge of the depth guide.

According to another aspect of the present invention, a stump grinding machine is configured to mount to a powered vehicle and is operable to grind a stump. The stump grinding machine comprises a mounting frame, a support frame, a disc mount and a grinding disc. The mounting frame is configured to connect to the powered vehicle. The support frame has first and second ends, with the first end being pivotally connected to the mounting frame. The support frame is cantileverly supported at the first end and extends generally horizontal from the mounting frame. The disc mount is pivotally mounted to the second end of the support frame and is pivotable about a generally horizontal pivot axis. The disc mount extends downwardly from the support frame. The grinding disc is rotatably mounted at the disc mount and has a plurality of grinding teeth on face of the grinding disc, such as the front face that is facing generally toward the powered vehicle or the rear face that is facing generally away from the powered vehicle. The grinding disc is rotatably drivable by a power source of the powered vehicle via a rotational drive device connected to the grinding disc. The disc mount is pivotable about the horizontal pivot axis to arcuately move the grinding disc as the grinding disc is rotatably driven by the rotational drive device to grind a stump. The rotational drive device is pivotable to accommodate the pivotal movement of the grinding disc about the generally horizontal axis.

The rotational drive device may comprise a telescopic drive shaft connected to the grinding disc and to a power takeoff of the vehicle. The telescopic drive shaft may be pivotable via a first universal joint at the grinding disc and a second universal joint at the power takeoff of the powered vehicle to accommodate the rotational driving of the telescopic drive shaft and the pivotal movement of the grinding disc about the generally horizontal axis during operation of the stump grinding machine.

According to yet another aspect of the present invention, a grinding disc for use with a stump grinding machine includes a generally circular plate portion, a plurality of grinding teeth and a plurality of depth guides. The grinding disc is rotatably driven by a drive shaft of the stump grinding machine to grind a stump. The generally circular plate portion has a grinding face and a center axis. The plurality of grinding teeth are arranged on the grinding face at varying radial distances from the center axis. The grinding teeth extend generally axially from the grinding face. The plurality of depth guides are positioned on the grinding face and extend generally axially therefrom. The depth guides extend a lesser amount from the grinding face that the grinding teeth. The depth guides limit the depth of cut of the grinding teeth as the grinding disc is rotatably driven by the drive shaft and engaged with a stump.

Therefore, the present invention provides a stump grinding machine that is operable to grind a stump to substantially remove the stump from the ground after a tree has been cut down. The grinding machine may pivotally move or swing the grinding disc about a generally horizontal axis to arcuately swing the grinding disc into engagement with the stump and through the stump as the grinding disc is rotatably driven via a rotational drive device connected to a power source of the powered vehicle. The grinding disc may include a plurality of depth guides that limit the depth of cut of the teeth on the disc to limit or substantially preclude over biting or over cutting of the stump by the teeth and, thus, to provide substantially smooth cutting or grinding of the stump. The grinding machine of the present invention may be cantileverly mounted to a powered vehicle and entirely supported by the mounting connections at the powered vehicle, such that no additional supports or support legs or feet or outriggers are required at the distal end of the grinding machine from the powered vehicle.

These and other objects, advantages, purposes and features of the present invention will become more apparent upon review of the following specification in conjunction with the drawings.

BRIEF DESCRIPTION OF THE DRAWINGS

FIG. 4 is a rear perspective view of the stump grinding machine of FIGS. 1–3;

FIG. 5 is another front perspective view of the stump grinding machine of FIGS. 1–4;

FIG. 6 is a side elevation of the stump grinding machine of FIGS. 1–5;

FIG. 7 is a plan view of the stump grinding machine of FIGS. 1–6;

FIG. 8 is a sectional view of the stump grinding machine taken along the line VIII—VIII in FIG. 7;

FIG. 9 is a plan view of the forward face of the grinding disc suitable for use with the stump grinding machine of the present invention;

FIGS. 10 and 11 are side elevations of the support arm and disc mount and grinding disc of the stump grinding machine of the present invention, showing the pivotal movement of the disc mount and grinding disc relative to the support arm;

DESCRIPTION OF THE PREFERRED EMBODIMENTS

Figure 1:
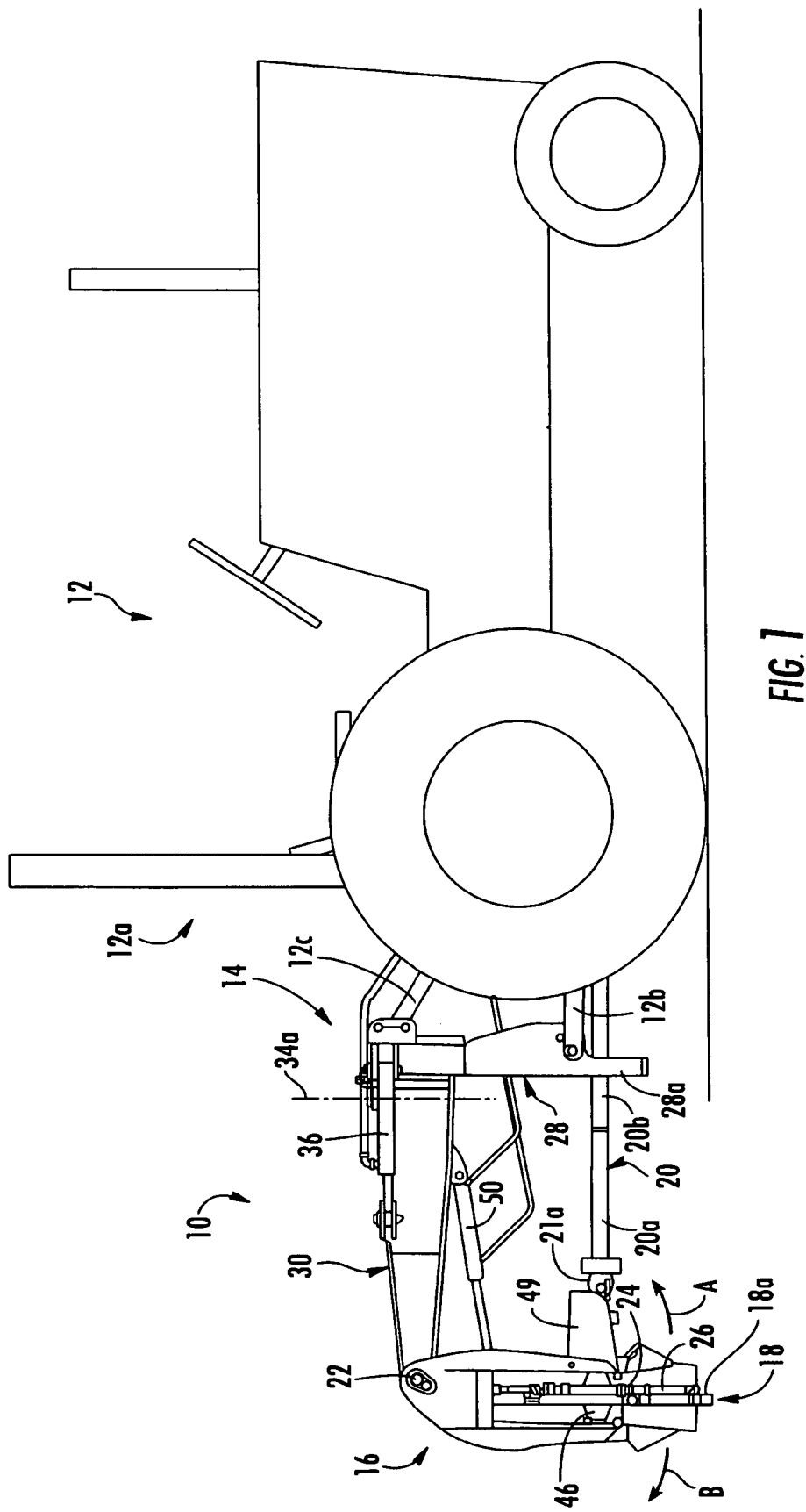
FIG. 1 is a side elevation of a stump grinding machine in accordance with the present invention, as mounted at a rear of a tractor.

Referring now to the drawings and the illustrative embodiments depicted therein, a stump grinding device or mechanism 10 is mountable to a powered device or vehicle, such as a tractor 12 or the like, such as at a rear portion or mounting portion 12a of the tractor 12 as shown in FIG. 1. Stump grinding machine 10 includes a mounting frame portion 14 that is attachable or mountable to the tractor 12, and a disc mounting portion 16 that is pivotally mounted at an outer or distal end of frame portion 14 away from the tractor 12. Disc mounting portion 14 mounts and supports a rotatable plate or disc or grinding disc 18, which is rotatably drive via a rotational drive device, such as a telescoping or telescopic drive shaft 20, connected between the grinding disc 18 and a power source of the vehicle, such as a power take off (not shown) of powered tractor 12. Disc mount 16 and grinding disc 18 are movable or pivotable about a generally horizontal axis 22 at the distal end of frame portion 14, such that grinding disc 18 may be swung or moved arcuately toward the tractor (in the direction of the arrow A in FIG. 1 and as shown in FIG. 10) or away from the tractor (in the direction of the arrow B in FIG. 1 and as shown in FIG. 11). Grinding disc 18 includes a plurality of teeth or blades 24 extending from a forward face 18a (the face of the plate or disc portion of the grinding disc that is facing toward the tractor 12) for cutting and grinding the stump as the forward face 18a of grinding disc 18 engages the stump as the disc is swung or moved in the direction of arrow A in FIG. 1, as discussed below. Grinding disc 18 may further include a plurality of depth guides or blocks 26 positioned on forward face 18a to control or limit the depth or cut of the blades 24 as the grinding disc 18 is moved into engagement with a stump or the like, as also discussed below.

As best shown in FIGS. 2–5, mounting frame portion 14 of stump grinding machine 10 includes a base or mounting or attachment bracket or portion or frame 28 and a generally horizontally extending support portion or support arm 30. Base portion 28 may mount to a mounting portion of a vehicle or tractor via any manner, depending on the particular application of the stump grinding machine and on the vehicle being used. In the illustrated embodiment, base portion 28 includes a pair of spaced apart generally vertical legs 28a and an upper cross member portion 28b extending between and connecting to the legs 28a. Each of the generally vertical legs 28a may be pinned or otherwise connected to a corresponding flange or mounting bracket 12b (FIG. 1) of mounting portion 12a of tractor 12 via a corresponding pin or bolt or the like 29a. Upper cross-member 28b of base portion 28 may also be pinned or otherwise connected or attached to tractor 12, such as via a pin or the like 29b extending through corresponding apertures in a mounting bracket 28c and a tractor mount or flange or bracket 12c (FIG. 1) extending from or disposed at the rear or mounting portion 12a of tractor 12. Base portion 28 thus may be attached to or secured to mounting portion 12a of tractor 12 via a three point connection, in order to substantially fixedly secure grinding machine 10 to the tractor 12.

Figure 3:
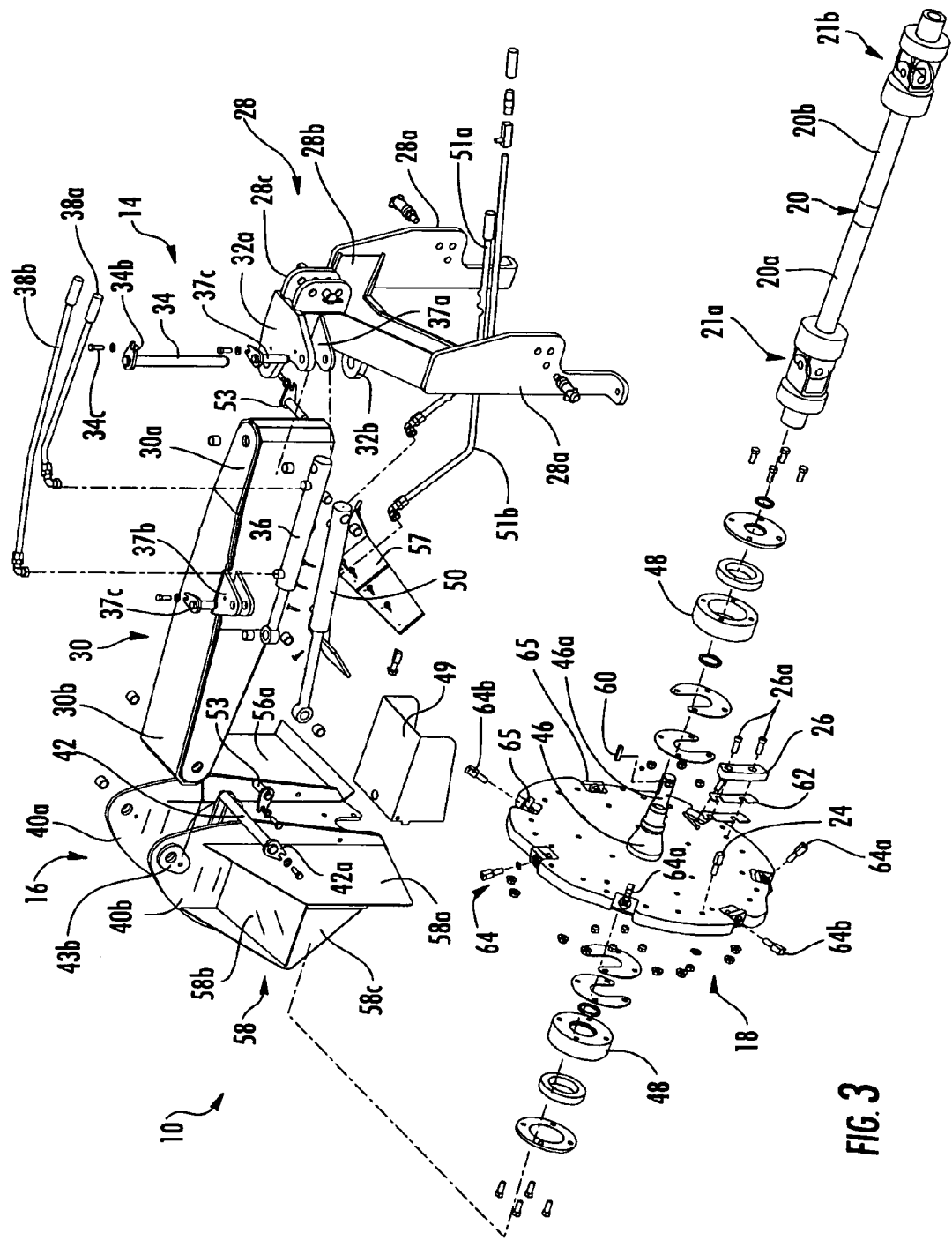
FIG. 3 is an exploded perspective view of the stump grinding machine of FIGS. 1 and 2.

Support arm or portion 30 may be pivotally mounted to upper cross member 28b of base portion 28 and may extend generally away from base portion 28 and tractor 12 when grinding machine 10 is mounted to the tractor. In the illustrated embodiment, upper cross member 28b includes an upper bracket or flange 32a and a lower bracket or flange 32b that extend generally rearwardly from upper cross member 28b. A tractor end or base end 30a of support arm 30 may be positioned between the brackets 32a, 32b, and may be pivotally secured thereto via a pivot pin 34, which defines a generally vertical pivot axis 34a about which support arm 30 may pivot relative to base portion 28. As shown in FIG. 3, pivot pin 34 may include a locking flange 34b that is securable to bracket 32a via a fastener 34c to retain pin 34 in position at brackets 32a. Support arm 30 extends outwardly or rearwardly from base portion 28, and the outer or distal end 30b of support arm 30 supports disc mount 16, as discussed below.

Optionally, support arm 30 may be pivoted about pivot axis 34a via an actuator 36, such as a hydraulic actuator or piston and cylinder device or the like. As best seen in FIG. 5, actuator 36 may be connected between a pair of spaced apart side flanges or brackets 37a at upper cross member 28b of base portion 28 and a pair of spaced apart side brackets 37b extending from a sidewall or portion 30c of support arm 30. In the illustrated embodiment, upper bracket 32a includes the upper portion of side flanges or brackets 37a extending generally sidewardly therefrom for mounting the cylinder 36a thereto. The actuator 36 may be pivotally mounted at each end to the respective bracket via a respective retaining pin 37c (FIG. 3) that may be securable or attachable to the bracket to retain the pin in position through the actuator ends and the brackets. Extension and retraction of actuator 36, such as via pressurized fluid being supplied to opposite ends or ports of the cylinder via fluid lines 38a, 38b, may cause pivotal movement of support arm 30 about pivot axis 34a to swing the support arm 30 and the disc mount 16 and grinding disc 18 side to side and arcuately with respect to base portion 28 and tractor 12. Fluid lines 38a, 38b may be connected to a hydraulic fluid pressure system or pump and reservoir of the tractor, and may be selectably pressurized via appropriate and known controls, such as solenoid valves and/or the like, at the tractor or at the grinding machine.

Figure 14:
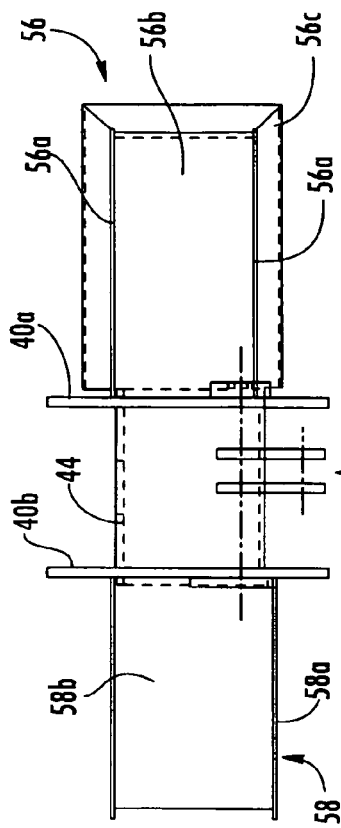
FIG. 14 is a plan view of the disc mount of FIGS. 12 and 13.
Figure 12:
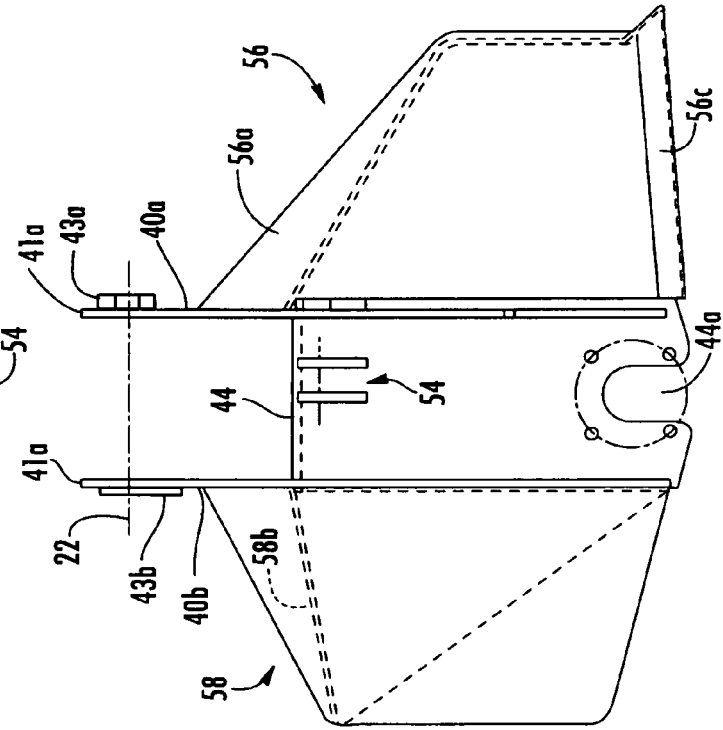
FIG. 12 is an end elevation of a disc mount suitable for use with the stump grinding machine of the present invention.
Figure 13:
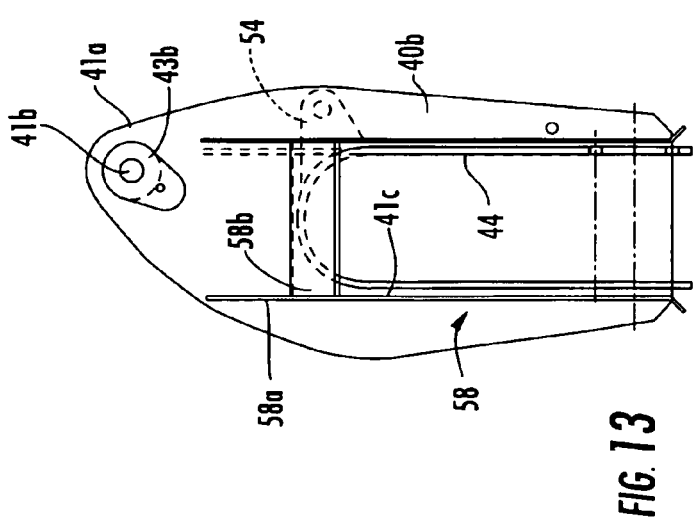
FIG. 13 is a side elevation of the disc mount of FIG. 12.

Disc mount 16 may be pivotally mounted to the outer or distal end 30b of support arm 30. In the illustrated embodiment, and as best shown in FIGS. 12–14, disc mount 16 includes a pair of spaced apart and generally vertical members or walls 40a, 40b, which are pivotally mounted at an upper end 41a to the outer end 30b of support arm 30 via a pivot pin 42 (FIG. 3) extending through openings 41b in the vertical plates 40 and openings in the end 30b of support arm 30 and defining the generally horizontal pivot axis 22. Sidewalls or plates 40a, 40b may also include respective bearing plates 43a, 43b positioned at and around apertures 41b for pivotally receiving pin 42 therethrough. Pin 42 may include a locking extension 42a (FIG. 3) that may be secured or fastened to one of the bearing plates 43b to secure pin 42 in place through side plates 40a, 40b and support arm 30.

Disc mount 16 includes a connecting cover or shroud 44 extending between the spaced part plates 40a, 40b and defining a cavity or passageway therethrough for the grinding disc 18. The spaced apart plates 40a, 40b may be secured at or welded to opposite ends of the cover 44 and may have slots or openings 41c formed therethrough to provide open ends of the cover 44. As best seen in FIG. 12, cover 44 includes a disc mounting slot 44a at a lower region of the cover 44 for receiving a shaft portion or axle 46 (FIGS. 3 and 8) of the grinding disc 18 therein for rotatably mounting grinding disc 18 to disc mount 16, as discussed in detail below. Cover 44 may also include a plurality of apertures arranged around disc mounting slot 44a for securing bearing blocks 48 (FIG. 3) to cover 44. As can be seen with reference to FIG. 3, bearing blocks 48 receive the axle or shaft 46 therethrough, such that grinding disc 18 may be rotatably mounted to and supported at disc mount 16. Disc mount 16 may also include a bearing cover 49 extending from a forward side of cover 44 to substantially cover the bearing block 48 at the forward end of shaft 46 of grinding disc 18.

Disc mount 16 may further include a shroud or cover 56 at one side of plate 40a and another shroud or cover 58 at the other side of the other plate 40b to at least partially cover the disc 18 and limit debris from being scattered and thrown by rotation disc 18 during operation of grinding machine 10. In the illustrated embodiment, cover 56 may comprise a pair of side plates 56a and a curved or bent upper plate 56b extending between the side plates and downward along the side plates to generally define a path or passageway for the disc 18 and debris. Shroud 56 may further include a lower skirt portion 57 (FIGS. 2–4 and 6–8), which may be a rubber or flexible portion, and which may be attached to a lower flange 56c along a lower edge of shroud panels 56a, 56b. The skirt 57 may be flexible to conform with the ground and/or stump to facilitate substantially uniform engagement of the skirt to the ground around the stump and to the stump itself to further limit or substantially preclude debris from being thrown outward and upward by the spinning disc during operation of grinding machine 10.

Cover or shroud 58 at the opposite side of disc mount 16 likewise includes a pair of side panels 58a and an upper panel 58b extending between side panels 58a. Upper panel 58b of shroud 58 may not extend downward as far as panel 56b of shroud 56, such that the discharge end of the shroud remains at least partially open. Because the disc rotates (such as in the counter-clockwise direction in FIG. 2) to throw or discharge debris in the direction of shroud 58, the debris is directed downward by upper panel 58b of shroud 58 to direct the debris downward toward the ground as it is discharged, so that debris will not be thrown upward, which may create a hazardous condition. As shown in FIG. 3, shroud 58 may further include a partial panel 58c extending downwardly from upper panel 58b to further direct the discharged debris downwardly.

Disc mount 16 may be pivotable about pivot pin 42 and axis 22 in response to extension and retraction of an actuator 50, such as a hydraulic actuator or piston/cylinder device or the like, connected between support arm 30 and disc mount 16. In the illustrated embodiment, actuator 50 may be pivotally mounted at a lower bracket 52 (FIGS. 2, 6, 10 and 11) along an underside 30d of support arm 30 and at another bracket 54 extending from a forward portion of cover 44, such that extension and retraction of actuator 50 causes pivotal movement of disc mount 16 about axis 22. Actuator 50 may be connected to the hydraulic system and controls of the vehicle or tractor via a pair of fluid lines 51a, 51b in fluid communication with respective ports at opposite ends of the hydraulic cylinder or the like. Actuator 50 may be pivotally mounted at each end to the respective brackets via a respective retaining pin 53 (FIG. 3) that may be securable or attachable to the bracket to retain the pin in position through the actuator ends and the brackets.

As can be seen with reference to FIG. 3, grinding disc 18 may be rotatably mounted to disc mount 16 via the pair of opposite bearing blocks 48 supporting shaft 46, which extends through a center portion of grinding disc 18. The bearing blocks 48 may be secured to or affixed to or mounted to opposite sides of cover 44 of the disc mount 16, and the opposite ends of shaft 46 may be received through or at least partially through the bearing blocks 48 to rotatably mount grinding disc 18 to disc mount 16. The bearing blocks may be a known type of bearing block and may include ball bearings or the like that may provide for smooth rotational support of the disc shaft 46 at the disc mount 16. As shown in FIG. 8, a forward end 46a of shaft 46 may extend through and forwardly from the forward bearing block 48 to connect shaft 46 to telescopic drive shaft 20.

As best shown in FIG. 3, rotational drive device or telescopic drive shaft 20 may be non-rotatably connected to forward end 46a of shaft 46 to provide for rotational driving of grinding disc 18 via rotation of telescopic drive shaft 20. Telescopic drive shaft 20 may include a universal joint 21a at a rearward end of the shaft 20 for connecting to shaft 46 of grinding device 18, and a second universal joint 21b at a forward end of shaft 20 for connecting to the power source or power takeoff of the tractor 12. Universal joint 21a may non-rotatably connect to forward end 46a of shaft 46, such that rotation of the universal joint 21a causes a corresponding rotation of shaft 46 and thus of grinding disc 18. As shown in FIG. 3, a locking pin or key 60 may be partially inserted within a groove in shaft 46 and within a corresponding groove in universal joint 21a, such that universal joint 21a is non-rotatably locked or joined with shaft 46. Universal joint 21b may be non-rotatably secured to the power takeoff shaft of the tractor in a similar manner. However, other means for non-rotatably connecting the universal joints to the shafts may be implemented without affecting the scope of the present invention.

Telescopic drive shaft 20 includes an outer tube or shaft portion 20a that is extendable and retractable relative to an inner tube or shaft portion 20b to adjust a length of drive shaft 20 during pivotal movement of disc mount 16 and grinding disc 18 about pivot axis 22. One of the tubes or shafts may be slidably received within the other tube or shaft to allow for such length adjustment via telescopic extension and retraction of one of the tubes or shafts relative to the other. Such telescopic shafts are known in the art and commercially available from Weasler Engineering, Inc. of West Bend, Wis., such that a detailed description of the telescopic drive shaft need not be set forth herein.

Telescopic shaft 20 thus may rotatably drive the shaft 46 and grinding disc 18 of grinding machine 10 via rotation of the drive shaft at the power takeoff of tractor 12. The universal joints 21a, 21b allow the shaft 20 to pivot relative to the axis of disc shaft 46 and the axis of the power takeoff shaft of the tractor as the telescopic drive shaft 20 extends and retracts while rotatably driving grinding disc 18 and while grinding disc 18 and disc mount 16 may be pivoted toward and away from the tractor about horizontal pivot axis 22. More particularly, the universal joints allow for angular adjustment between the axis of the disc shaft 46 and the axis of the telescopic drive shaft 20 and between the axis of the telescopic drive shaft 20 and the axis of the power takeoff shaft of the tractor 12 during pivotal movement of disc mount 16 about pivot axis 22 and during rotational driving of the telescopic drive shaft and the grinding disc. The extension and retraction and the angular adjustment of the telescopic drive shaft between the axes of the disc shaft and the power takeoff shaft thus allows for the non-linear or arcuate movement of the grinding disc relative to the power takeoff drive shaft during operation of the stump grinding machine. Although shown and described has having a telescopic drive shaft connected between the power takeoff an the grinding disc, the stump grinding machine may include other rotational drive devices or drive means for rotatably driving the grinding disc, such as a hydraulic motor (as discussed below with respect to FIGS. 15–19) or other drive motor or the like mounted at the disc mount, without affecting the scope of the present invention.

Rotation of drive shaft 20 thus causes a corresponding rotation of grinding disc 18, while grinding disc 18 may be pivoted toward and into engagement with a stump or the like. The teeth or blades 24 arranged on the face 18a of grinding disc 18 then function to cut or grind the stump as the grinding disc is moved further into engagement with the stump. The teeth or blades may comprise carbide tipped teeth or blades to enhance the performance and life of the teeth or blades. The teeth or blades 24 may include a shaft or mounting portion that may extend through an opening or bore formed through grinding disc 18, and may be secured in position via a nut or other fastener at the other or rear side or face 18b of grinding disc 18, such that the teeth are substantially secured in place and extend forwardly from forward face 18a of grinding disc 18. The teeth 24 thus may be removable and replaceable as they may wear over time and use. As can be seen with reference to FIG. 9, the teeth may be arranged on face 18a and spaced apart to provide at least one tooth or blade at various generally overlapping radial positions on the face, such that during rotation of the grinding disc, the blades may function to substantially cut or grind at the stump over substantially all of the face of the grinding disc or at least over substantially the lower half of the face of the grinding disc below the shaft 46.

Figure 2:
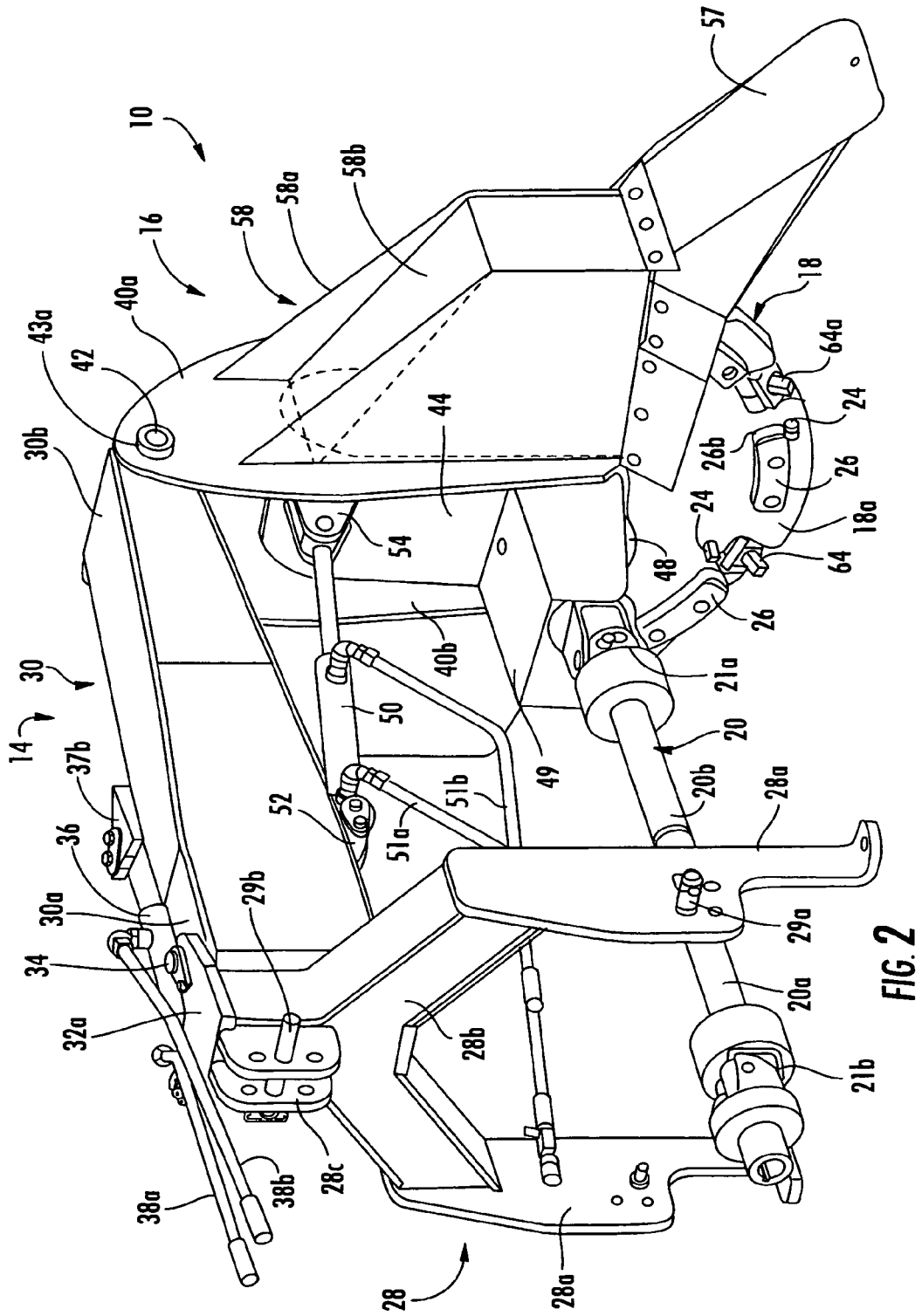
FIG. 2 is a front perspective view of the stump grinding machine of FIG. 1.

The depth of the cut of the teeth 24 may be limited by the depth guides or rakers 26 to limit or substantially preclude over cutting or over biting of the teeth into the stump as grinding disc 18 moved into engagement with the stump. As best seen in FIGS. 2 and 9, the depth guides 26 may be positioned along face 18a toward the outer circumferential edge of disc 18. In the illustrated embodiment, depth guides 26 comprise curved blocks that are mounted to or affixed to or positioned at the outer region of face 18a of grinding disc 18. Optionally, the depth guides or blocks 26 may have a sharpened or hardened edge or cutting edge 26b (FIG. 2) along a forward edge of the blocks to further assist in cutting or grinding the stump during operation of the grinding machine.

The depth guides or blocks 26 may be mounted to face 18a via respective pairs of fasteners or bolts 26a that extend through blocks 26 and into threaded openings bored or formed in grinding disc 18. The depth guides 26 may be affixed to disc 18 via fasteners extending through the depth guides and into threaded bores or openings in the disc 18, or may be secured via fasteners or bolts extending through the depth guides 26 and through the disc 18 and into threaded engagement with corresponding nuts or fasteners at the opposite side or face 18b of grinding disc 18. Optionally, the depth guide may be welded or otherwise secured or affixed to face 18a of grinding disc 18, without affecting the scope of the present invention.

In an exemplary embodiment, the depth guides 26 and teeth 24 may be set such that teeth 24 may extend approximately ⅛ of an inch beyond the outer or forward surface of the depth guides 26 to provide a desired degree of bite or cut during each pass of the teeth over the stump. Optionally, the depth guides 26 may be adjustably mounted to face 18a of grinding disc 18 to adjust the depth limit of the cut of the teeth during operation of the grinding machine. For example, and as shown in FIG. 3, depth guides 26 may be mounted to face 18a of disc 18 with one or more plates or shims 62 positioned between the depth guide or block 26 and the face 18a of grinding disc 18. If a greater depth of cut is desired, one or more of the plates or shims 62 may be removed, thereby reducing the height of the depth guide on the face 18a of disc 18 and, thus, increasing the bite or cut depth of the teeth 24 of grinding disc 18.

Grinding disc 18 may further include a plurality of circumferential blades or teeth 64 arranged or positioned or spaced along the outer circumferential edge of disc 18. Teeth 64 may function to cut and grind the stump as grinding disc 18 is removed downwardly and forwardly into engagement with the stump. As can be seen with reference to FIGS. 2 and 3, circumferential teeth 64 may extend at various angles relative to disc 18 to enhance the cutting and grinding of the stump along the circumferential edge of grinding disc 18. For example, some circumferential teeth or blades 64a (FIG. 3) may be angled generally forwardly with respect to grinding disc 18, while other circumferential teeth or blades 64b may extend generally radially outwardly along the circumferential edge portion of disc 18. Other circumferential teeth may be angled rearwardly, without affecting the scope of the present invention. The circumferential blades or teeth 64 may be secured to blocks 65 positioned in notches 18c (FIG. 9) in disc 18 and set at various angles, such that the teeth 64 extend from the blocks and outwardly of the circumferential edge of disc 18 to assist in starting the cut via lowering the disc downward into the stump and to provide a wider cutting range along the circumferential edge of the disc to enhance cutting or grinding of stump during operation of stump grinding machine 10.

Because the depth guides limit or substantially preclude excessive or overly aggressive cutting or over biting by the teeth or blades of the grinding disc, the grinding operation of the stump grinding machine of the present invention is substantially enhanced over known or conventional stump cutting or grinding devices. The cutting teeth are limited to a desired depth of cut with each rotation of the grinding disc, which limits or substantially precludes excessive vibration or binding of the teeth and disc during operation of the grinding machine. Because the grinding disc of the present invention thus may provide for a smoother operation of the grinding machine, the mounting frame 14 of the grinding machine may be mounted to and entirely supported at or by the rear or mounting portion of the vehicle, such that the support arm may be cantileverly attached to the vehicle and may extend outwardly therefrom, with no support legs or arms or outriggers at the outer end 30b of support arm 30 being necessary to stabilize and further support the grinding disc 18 above the ground.

During operation of the stump grinding machine of the present invention, the tractor may be positioned generally adjacent to a stump to be removed or ground, such that the support arm 30 extends generally over the stump, with the disc mount 16 and grinding disc 18 positioned on the opposite side of the stump from the tractor. After the disc is positioned at a desired initial position relative to the stump, the disc 18 may be rotatably driven via the power takeoff of the tractor and telescopic drive shaft 20. For example, the disc may be rotated at approximately 540 rpms or 1,000 rpms, which are two rpm settings on a typical tractor power takeoff, and may be driven via a tractor that provides an output of approximately 40 to 90 horsepower. However, the grinding disc may be rotated at other speeds and may be driven via other powered outputs, without affecting the scope of the present invention. While the grinding disc 18 is rotated by the power takeoff of the tractor, the disc mount 16 may be pivoted downwardly about pivot axis 22 via retraction of actuator 50 to pull the grinding disc 18 into engagement with the stump to grind the stump during a first swing or pass of the grinding disc through the stump. The telescopic drive shaft 20 may retract and may pivot about universal joints 21a, 21b while the grinding disc 18 is swung toward the tractor and while the telescopic shaft 20 is rotated to rotatably drive the disc. The teeth of the grinding disc engage the stump and cut or grind the stump as the grinding disc is moved therethrough, while the depth guides 26 may limit over biting or over cutting by the teeth to maintain a substantially uniform and stable cut by the grinding disc 18.

After a first pass of the grinding disc through the stump has been completed, the disc mount 16 and grinding disc 18 may be pivoted back to their initial position via extension of actuator 50. The support arm 30 may then be pivoted or swung or moved sidewardly about the generally vertical pivot axis 34a via extension or retraction of actuator 36 to position the grinding disc toward one side or the other of the path of the first pass through the stump. After the support arm 30 and disc mount 16 have been pivoted or moved a desired amount, the disc mount 16 may then again be pivoted about horizontal pivot axis 22 to move or swing grinding disc 18 through a second path or pass through the stump.

Although shown and described as having the cutting or grinding teeth extending from a front face of the grinding disc for grinding a stump as the disc is pulled or moved forwardly through the stump, it is envisioned that the grinding disc may have the grinding teeth (and depth guides) extending from the rear face of the disc for grinding a stump as the stump grinding machine moves the grinding disc rearwardly through the stump, without affecting the scope of the present invention. For example, the actuator 50 may initially retract to move the disc mount and the grinding disc toward the tractor (in the direction of arrow A in FIG. 1), and then may extend to move the disc mount and the grinding disc arcuately and rearwardly (in the direction of arrow B in FIG. 1) to engage the rear face of the disc with the stump and to move the grinding disc through the stump as the grinding disc is rotatably driven by the power takeoff and telescopic drive shaft.

Figure 15:
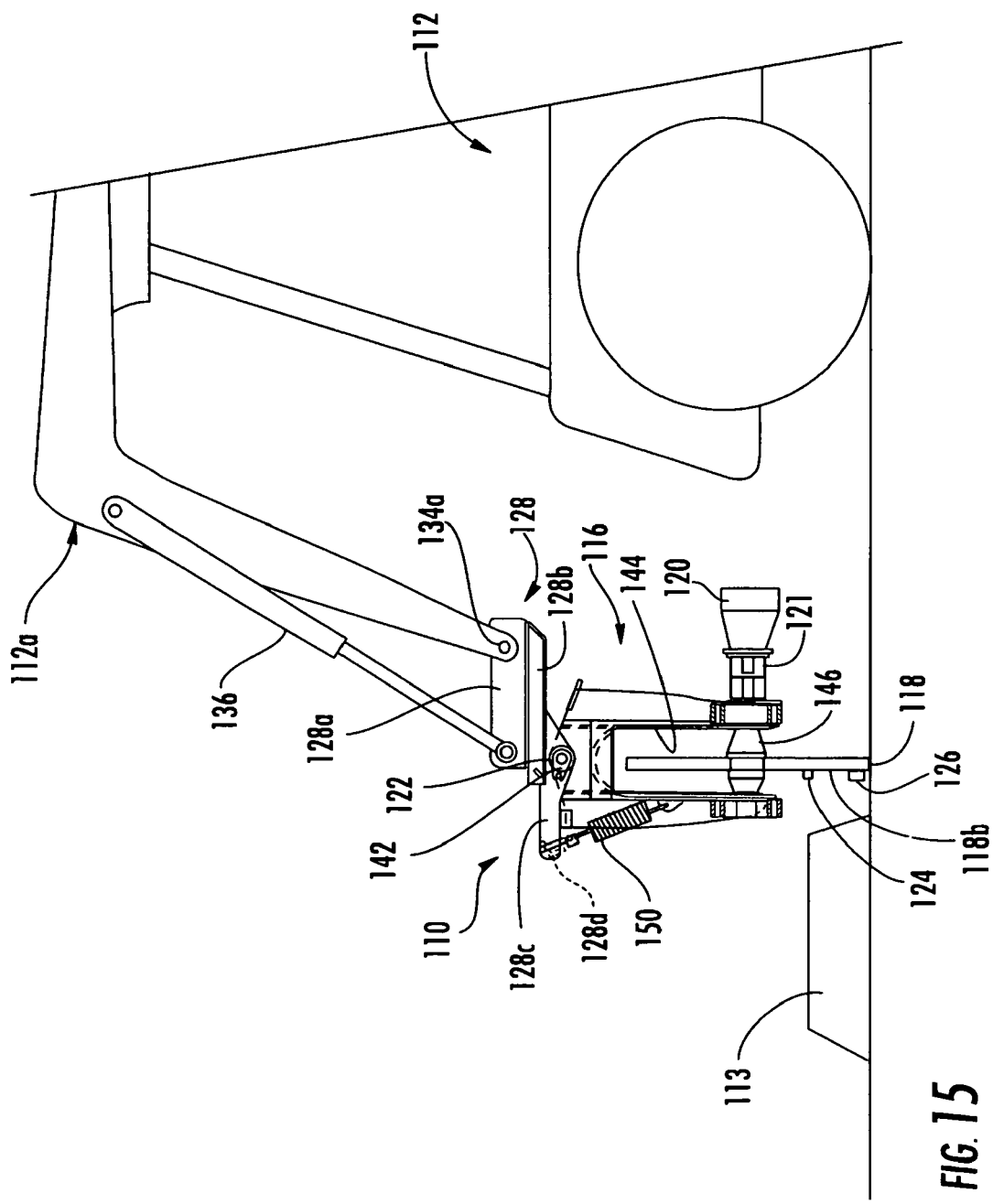
FIG. 15 is a side elevation of another stump grinding machine in accordance with the present invention, with the stump grinding machine being mounted to a skid steer.
Figure 16:
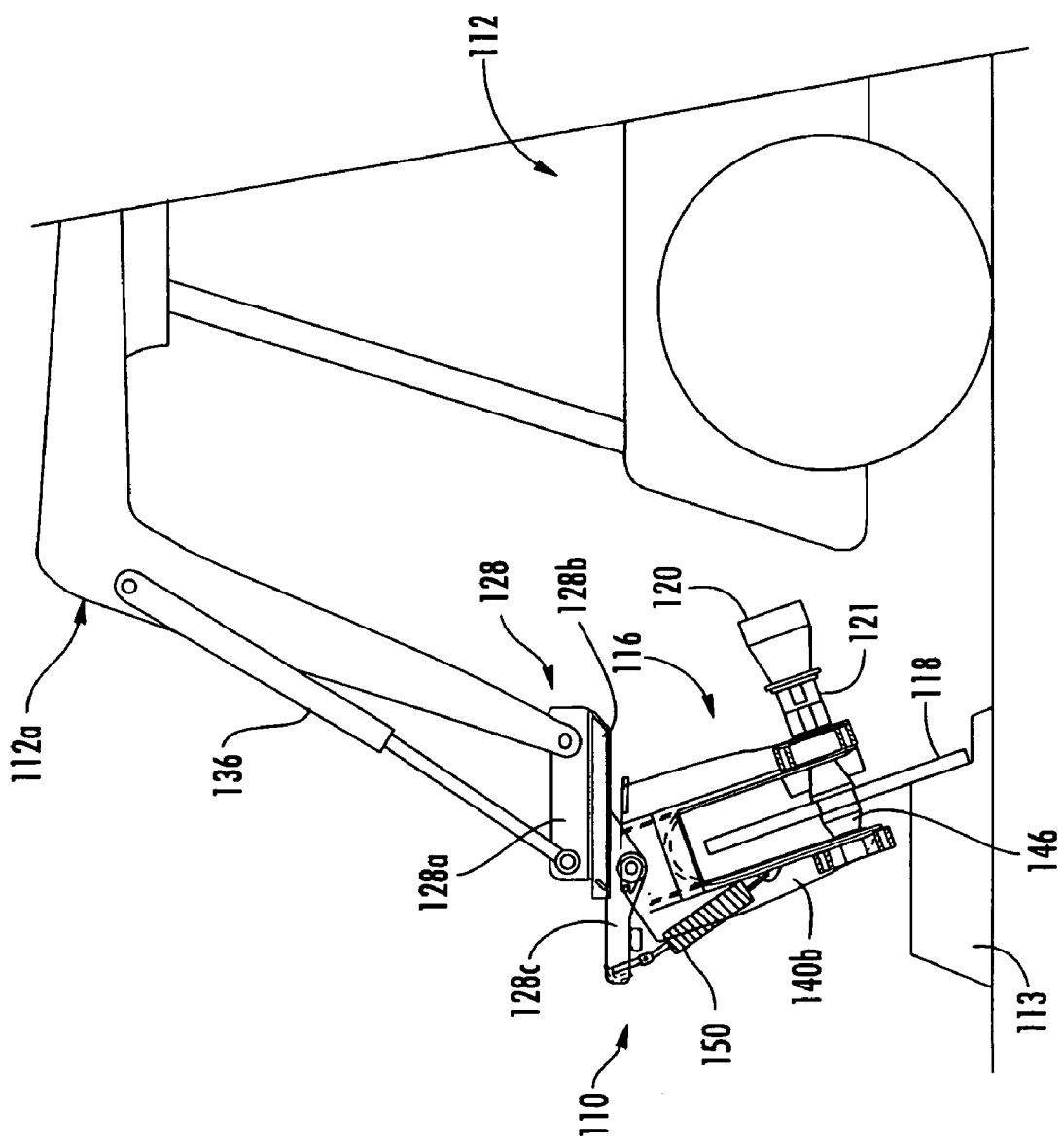
FIG. 16 is a side elevation similar to FIG. 15, with the stump grinding machine being engaged with a stump.
Figure 19:
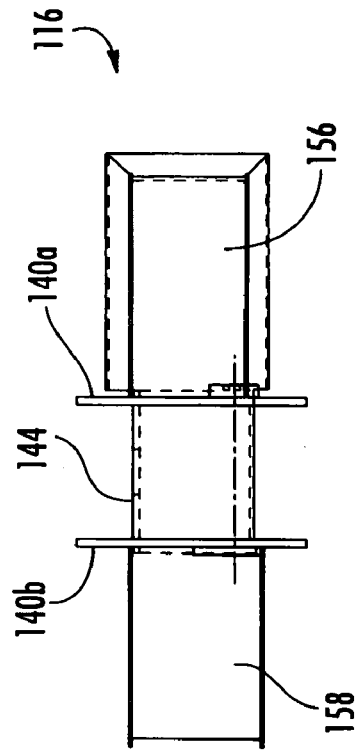
FIG. 19 is a plan view of the stump grinding machine of FIGS. 17 and 18.

Also, although shown in FIG. 1 and described above as being mounted to a powered tractor, the stump grinding machine of the present invention may be adaptable to mount to other powered devices or vehicles or the like, without affecting the scope of the present invention. For example, and with reference to FIGS. 15–19, a stump grinding machine or device 110 may be configured to mount or attach to a mounting portion or support arm 112a of a powered skid steer 12 or the like. Stump grinding machine 110 includes a mounting bracket or frame 128 and a disc mounting assembly or shroud or disc mount 116 that is pivotally attached to mounting frame 128 and that is pivotable about a generally horizontal pivot axis 122 relative to mounting frame 128. As shown in FIGS. 15 and 16, mounting frame 128, disc mount 116 and grinding disc 118 may be supported entirely by the connection of mounting frame 128 to the support arm 112a of powered vehicle or skid steer 112, such that no other support arms or stabilizers or outriggers are required at the disc mount to support or stabilize the disc mount and grinding disc away from the powered vehicle or skid steer.

Mounting frame 128 may be pivotally attached to the support arm 112a and may be pivotable about a second generally horizontal pivot axis 134a. Disc mount 116 rotatably supports a grinding disc 118 that may be rotatably driven via a rotational drive motor or device 120, such as a hydraulic motor or the like, that is connected to an axle portion 146 of grinding disc 118 via a coupler 121. Rotational drive motor 120 may be fixedly mounted or secured to disc mount 116, such as to a cover portion 144 (discussed below) of disc mount 116, such that rotational driving of drive motor 120 causes a corresponding rotation of grinding disc 118. Rotational drive motor 120 thus rotatably drives grinding disc 118 as disc mount 116 is pivoted about the horizontal axis, such as in a similar manner as described above. As shown in FIG. 15, grinding disc 118 may have the grinding teeth 124 and depth guides 126 on the rearward face 118b (the face that is facing away from the powered vehicle). Rotational drive motor 120 may comprise a hydraulic motor and may be connected to or in fluid communication with a power source or hydraulic pump system of the powered vehicle or skid steer, such as via hydraulic lines (not shown) that may run along the disc mount and mounting frame and along the support arm 112a of vehicle 112 to the appropriate ports and controls or valves of the hydraulic system. Optionally, grinding disc 118 may be rotatably driven via other rotational drive devices, such as a telescopic drive shaft that may adjust in length and may adjust an angular orientation relative to the axle portion and a power takeoff of the vehicle to accommodate arcuate movement of the grinding disc as the disc mount is pivoted about the horizontal pivot axis (such as discussed above), without affecting the scope of the present invention.

Mounting frame 128 may comprise a generally flat plate portion 128b and a pair of generally vertical brackets or braces 128a extending upwardly from the plate portion 128b and pivotally attaching to the support arm 112a of the vehicle 112. The plate portion 128b may have a pair of rearwardly extending braces 128c connected to and extending partially along a lower surface of plate portion 128b. Braces 128c include a biasing member mounting bracket 128d at an outer end thereof (such as an angle iron or the like positioned between and connected to the outer ends of a pair of braces 128c) for mounting an end of one or more biasing members 150 for urging disc mount 116 to pivot about pivot axis 122, as discussed below. Braces 128c also have an opening for receiving a pivot pin 142 therethrough for pivotally mounting disc mount 116 to mount frame 128 and defining horizontal pivot axis 122.

Disc mount 116 may be substantially similar to disc mount 16, discussed above, such that a detailed description of disc mount 116 need not be repeated herein. Sufficient it to say that disc mount 116 includes a pair of spaced apart and generally vertical members or walls 140a, 140b, which are pivotally mounted at an upper end to mounting frame 128 via pivot pin 142. Disc mount 116 also includes a connecting cover or shroud 144 extending between the spaced apart plates 140a, 140b and defining a cavity or passageway therethrough for the grinding disc 118. The spaced apart plates 140a, 140b may be secured at or welded to opposite ends of the cover 144 and may have slots or openings formed therethrough to provide open ends of the cover 144. The grinding disc 118 may be rotatably mounted to disc mount 116, such as at bearing blocks 148 secured to cover 144, such as in the manner described above. The rotational drive motor 120 may be fixedly secured to the cover 144, such that rotational driving of a shaft portion or drive portion of the motor causes a corresponding rotation of axle 146 and grinding disc 118 relative to the fixed motor body. Disc mount 116 may further include a shroud or cover 156 at one side of plate 140a and another shroud or cover 158 at the other side of the other plate 140b to at least partially cover the disc 118 and limit debris from being scattered and thrown by rotation of the disc during operation of stump grinding machine 110.

Figure 18:
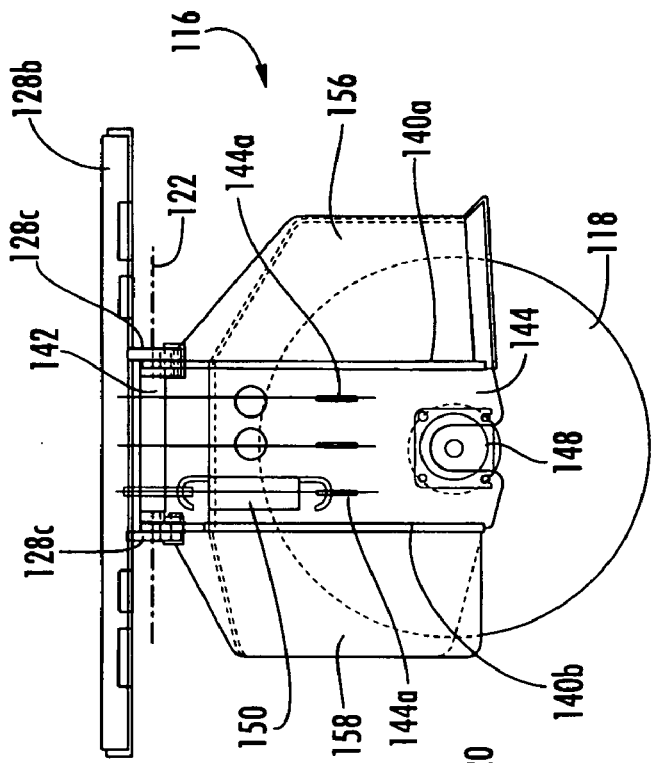
FIG. 18 is an end elevation of the stump grinding machine of FIG. 17.
Figure 17:
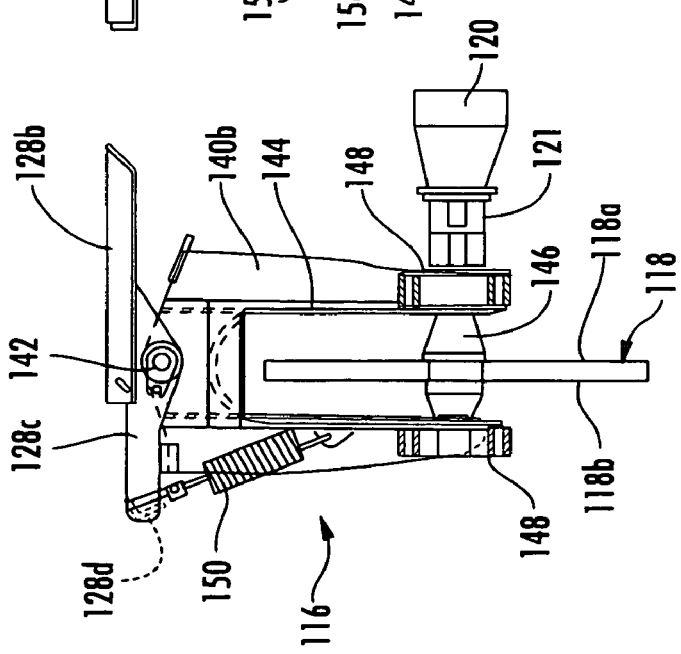
FIG. 17 is a side elevation and partial sectional view of the stump grinding machine of FIGS. 15 and 16.

As best seen with reference to FIGS. 17 and 18, one or more biasing members 150 (such as three biasing members) may be connected between bracket 128d and corresponding brackets 144a protruding from a rear surface of cover 144 of disc mount 116. Biasing members 150 function to urge or bias disc mount 116 to pivot outwardly about pivot axis 122 relative to mounting frame 128 (such as to pivot in a clockwise direction in FIGS. 15–17). The size and force of the biasing members or springs (and the number of springs) may be selected depending on the particular application and desired force urging the disc mount and grinding disc toward and into engagement with and through the stump, as discussed below.

During operation, the powered vehicle or skid steer 112 may be driven or moved up to and next to a stump 113, as shown in FIG. 15. The rotational drive motor 120 may be operable to rotatably drive the grinding disc 118 in response to actuation of the appropriate control or valve or the like at the vehicle or at the grinding machine, and the powered vehicle may be moved further toward the stump to move or push the grinding disc into engagement with the stump to grind the stump. As the vehicle, and thus the mounting frame 128, are moved toward the stump and the disc engages the stump, the disc mount 116 and disc 118 may pivot about pivot axis 122 (as shown in FIG. 16). The biasing member or members 150 function to pull or urge the disc mount and grinding disc back toward the initial position and thus pull the disc further into and through the stump while the disc grinds the stump. Optionally, the disc mount and grinding disc may be pivoted toward the initial, generally vertical orientation and beyond via pivotal movement of mounting frame 128 about pivot axis 134a via retraction of actuator 136. The rear face 118b of grinding disc 118 thus may be moved through the stump to grind the stump. The process may be repeated for multiple passes through the stump to further grind the stump.

Although shown and described as being urged and pivoted rearwardly to move the rear surface of the grinding disc through the stump in a direction away from the powered vehicle, it is envisioned that the front face 118a of the grinding disc 118 may include the teeth and depth guides (similar to front face 18a of grinding disc 18, discussed above), and the disc mount 116 may be pivoted forwardly to move the front face into engagement with and through the stump, such as in a similar manner as described above, without affecting the scope of the present invention. For example, the actuator 136 may be initially retracted to pivot the mounting frame 128 and disc mount 116 about pivot axis 134a to raise and pivot the grinding disc to provide clearance to position the grinding disc on the opposite side of the stump. The actuator 136 may then extend to lower and pivot the grinding disc into engagement with the stump and another actuator or biasing member (not shown) may function to pull or pivot the disc mount and grinding disc about pivot axis 122 to move the grinding face forwardly and arcuately into and through the stump.

Therefore, the present invention provides a grinding machine or device or assembly that is operable to grind a stump to substantially remove the stump from the ground after a tree has been cut down. The grinding machine may pivotally move or swing the grinding disc about a generally horizontal axis to arcuately swing or pivot or move the grinding disc into engagement with the stump and through the stump as the grinding disc is rotatably driven, such as via a telescopic drive shaft connected to a power takeoff of a powered vehicle or via a rotational drive motor mounted to the disc mount or via other drive means. The grinding disc may include a plurality of rakers or depth guides or blocks that limit the depth of cut of the grinding teeth on the disc to limit or substantially preclude over biting or over cutting of the stump by the teeth and, thus, to provide substantially smooth and stable cutting or grinding of the stump. The grinding machine of the present invention may be cantileverly mounted to a powered vehicle, such as a tractor or skid steer or the like, and/or may be entirely supported by the mounting connections at the powered vehicle, such that no additional supports or support legs or feet or outriggers are required at the distal end of the grinding machine from the powered vehicle. The disc mount and grinding disc thus may be supported entirely by the support arm connected to the powered vehicle and not by any additional supports between the disc mount or support arm and the ground.

Changes and modifications in the specifically described embodiments can be carried out without departing from the principles of the present invention, which is intended to be limited only by the scope of the appended claims as intepreted according to the principles of patent law.

The invention claimed is:

1. A stump grinding machine that is configured to mount to a powered vehicle, said stump grinding machine being operable to grind a stump and comprising:

a mounting frame configured to connect to the vehicle and to extend generally outwardly therefrom, said mounting frame extending outward from the vehicle and being supported entirely at the vehicle;

a disc mount supported at said mounting frame; and a grinding disc rotatably mounted to said disc mount and rotatable about a disc axis, said grinding disc having a plurality of grinding teeth on a face of said disc, said grinding disc being rotatably drivable by a rotational drive device connected to said grinding disc and to a power source of the powered vehicle, said grinding disc being rotatably driven and being movable in a direction generally along said disc axis and toward and into engagement with a stump to grind at least a portion of the stump as said grinding disc is moved axially at least partially through the stump, said grinding disc including a plurality of depth guides positioned on said face of said grinding disc, said depth guides being positioned on said face of said grinding disc at different locations than said grinding teeth, said depth guides limiting the depth of cut of said grinding teeth as said grinding disc is rotated and engaged with a stump.

2. The stump grinding machine of claim 1, wherein said depth guides comprise blocks spaced along a radial path on said face of said grinding disc.

3. The stump grinding machine of claim 1, wherein said rotational drive device comprises a telescopic drive shaft connected to said grinding disc and configured to connect to a power takeoff of the powered vehicle, said telescopic drive shaft defining a shaft axis that is adjustable relative to said disc axis, a length of said telescopic drive shaft being adjustable during arcuate movement of said grinding disc.

4. The stump grinding machine of claim 1, wherein said mounting frame comprises a base portion attachable to the powered vehicle and a support portion mounted at one end to said base portion and extending generally horizontally from said base portion, said disc mount being pivotally attached to an opposite end of said support portion from said base portion.

5. The stump grinding machine of claim 4, wherein said support portion is pivotally mounted to said base portion and is pivotable about a generally vertical axis.

6. The stump grinding machine of claim 5, wherein said support portion is pivotable about said generally vertical axis via a first actuator and said disc mount is pivotable about said generally horizontal axis via a second actuator.

7. The stump grinding machine of claim 4, wherein said face of said grinding disc comprises a front face that is facing generally toward the powered vehicle when said stump grinding machine is connected to the powered vehicle.

8. The stump grinding machine of claim 4, wherein said face of said grinding disc comprises a rear face that is facing generally away from the powered device when said stump grinding machine is connected to the vehicle.

9. The stump grinding machine of claim 1, wherein said stump grinding machine is configured to mount to a powered tractor.

10. The stump grinding machine of claim 1, wherein said depth guides are adjustably mounted to said grinding disc to adjust a depth of cut of said grinding teeth.

11. The stump grinding machine of claim 1, wherein said disc mount is pivotable about a generally horizontal axis relative to said mounting frame to arcuately move said grinding disc as said grinding disc is rotatably driven via said rotational drive device to grind a stump.

12. The stump grinding machine of claim 11, wherein said mounting frame comprises a base portion attachable to the vehicle and a support portion mounted at one end to said base portion and extending generally horizontally from said base portion, said disc mount being pivotally attached to an opposite end of said support portion from said base portion.

13. The stump grinding machine of claim 12, wherein said support portion is pivotally mounted to said base portion and is pivotable about a generally vertical axis.

14. The stump grinding machine of claim 1 including a biasing spring disposed between a portion of said mounting frame and a portion of said disc mount, said biasing spring biasing said disc mount toward an initial orientation, said disc mount pivoting about a generally horizontal axis away from said initial orientation in response to said grinding disc being moved into engagement with a stump, said biasing spring urging said grinding disc into and at least partially through the stump while said grinding disc is rotated to grind the stump.

15. The stump grinding machine of claim 2, wherein said depth guides include a cutting edge along a forward edge thereof.

16. A stump grinding machine that is configured to mount to a powered vehicle, said stump grinding machine being operable to grind a stump and comprising:
a mounting frame configured to connect to the vehicle and to extend generally outwardly therefrom, said mounting frame extending outward from the vehicle and being supported entirely at the vehicle;
a disc mount supported at said mounting frame; and
a grinding disc rotatably mounted to said disc mount and rotatable about a disc axis, said grinding disc having a plurality of grinding teeth extending outward from a face of said disc, said grinding disc being rotatably drivable by a rotational drive device connected to said grinding disc and to a power source of the powered vehicle, said grinding disc being rotatably driven and being movable in a direction generally along said disc axis and toward and into engagement with a stump to grind at least a portion of the stump as said grinding disc is moved axially at least partially through the stump, said grinding disc including a plurality of depth guides positioned on said face of said grinding disc, said depth guides protruding outward from said face of said grinding disc to limit the depth of cut of said grinding teeth as said grinding disc is rotated and engaged with a stump, wherein said depth guides are adjustably mounted to said grinding disc and are adjustable to adjust a degree of protrusion from said face to adjust a depth of cut of said grinding teeth.

17. The stump grinding machine of claim 16, wherein said depth guides are adjustably mounted via at least one shim plate removably positioned between said depth guide and said face of said grinding disc.

18. The stump grinding machine of claim 16 including a biasing spring disposed between a portion of said mounting frame and a portion of said disc mount, said biasing spring biasing said disc mount toward an initial orientation, said disc mount pivoting about a generally horizontal axis away from said initial orientation in response to said guiding disc being moved into engagement with a stump, said biasing spring urging said grinding disc into and at least partially through the stump while said grinding disc is rotated to grind the stump.

19. The stump grinding machine of claim 16, wherein said depth guides comprises blocks spaced along a radial path on said face of said grinding disc.

20. The stump grinding machine of claim 19, wherein said depth guides include a cutting edge along a forward edge thereof.

21. A stump grinding machine that is configured to mount to a powered vehicle, said stump grinding machine being operable to grind a stump and comprising:
a mounting frame configured to connect to the vehicle;
a support frame having first and second ends, said first end being pivotally connected to said mounting frame and pivotable about a generally vertical pivot axis, said support frame being cantileverly supported at said first end and extending generally horizontally from said mounting frame;
a disc mount pivotally mounted to said second end of said support frame and being pivotable about a generally horizontal axis, said disc mount extending downwardly from said support frame; and
a grinding disc rotatably mounted at said disc mount and rotatable about a disc axis, said grinding disc having a plurality of grinding teeth and a plurality of depth guides on a face of said grinding disc, said grinding disc being rotatably drivable by a rotational drive device connected to said grinding disc and a power source of the powered vehicle, said disc mount being pivotable about said generally horizontal axis to arcuately move said grinding disc in a direction generally along said disc axis as said grinding disc is rotatably driven via said drive device to move said grinding disc axially toward and into engagement with a stump to at least partially grind the stump, said depth guides comprising blocks protruding from said face of said grinding disc to limit a depth of cutting of said grinding teeth as said grinding disc is rotated and moved axially into engagement with at least partially through the stump, wherein said support frame is pivotable about said generally vertical axis via a first actuator and said disc mount is pivotable about said generally horizontal axis via a second actuator.

22. The stump grinding machine of claim 21, wherein said rotational drive device comprises a telescopic drive shaft connected to said grinding disc and configured to connect to a power takeoff of the vehicle, a shaft axis of said telescopic drive shaft being adjustable relative to a disc axis of said grinding disc and relative to an axis of the power takeoff of the vehicle and a length of said telescopic drive shaft being adjustable during arcuate movement of said grinding disc.

23. The stump grinding machine of claim 21, wherein said depth guides are adjustably mounted to said grinding disc to adjust a depth of cut of said grinding teeth.

24. The stump grinding machine of claim 21, wherein said disc mount comprises a shroud portion that houses said grinding disc and a mounting bracket that is pivotally mounted to said support frame.

25. The stump grinding machine of claim 24, wherein said mounting bracket is pivotable about said horizontal axis in response to an actuator that is connectable between said support frame and said mounting bracket.

26. The stump grinding machine of claim 24, wherein said disc mount is biased toward an initial orientation, said disc mount pivoting about said horizontal axis away from said initial orientation in response to said grinding disc being moved into engagement with a stump via movement of the vehicle relative to the stump.

27. The stump grinding machine of claim 26, wherein said disc mount is biased to urge said grinding disc into and at least partially through the stump to grind the stump after movement of the vehicle is stopped.

28. The stump grinding machine of claim 21, wherein said plurality of teeth are spaced radially along said face of said grinding disc.

* * * * *

UNITED STATES PATENT AND TRADEMARK OFFICE
CERTIFICATE OF CORRECTION

PATENT NO. : 7,150,300 B1
APPLICATION NO. : 10/669109
DATED : December 19, 2006
INVENTOR(S) : Dale R. Peterson It is certified that error appears in the above-identified patent and that said Letters Patent is hereby corrected as shown below:

Title page, item (57) Abstract
Line 3, "and is a disc mount" should be --and a disc mount--

Column 3
Line 58, "that" should be --than--

Column 5
Line 1, "mechanism" should be --machine--
Line 10, "drive device" should be --driven device--
Line 25, insert --the-- before "arrow A"

Column 6
Line 3, "brackets" should be --bracket--
Line 49, "part" should be --apart--

Column 7
Line 5, "rotation disc" should be --rotation of disc--
Line 58, delete "the" before --disc--

Column 8
Line 7, "device" should be --disc--
Line 56, "an" should be --and--

Column 9
Line 25, insert --and-- after "face 18a"
Line 67, "removed" should be --moved--

Column 12
Line 30, "mount frame 128" should be --mounting frame 128--
Line 34, "Sufficient" should be --Suffice--

Column 13
Line 45, "face" should be --disc--

UNITED STATES PATENT AND TRADEMARK OFFICE
CERTIFICATE OF CORRECTION

PATENT NO. : 7,150,300 B1
APPLICATION NO. : 10/669109
DATED : December 19, 2006
INVENTOR(S) : Dale R. Peterson It is certified that error appears in the above-identified patent and that said Letters Patent is hereby corrected as shown below:

Column 14
Line 10, "intepreted" should be --interpreted--

Column 16
Claim 18, Line 6, "guiding" should be --grinding--
Claim 19, Line 12, "comprises" should be --comprise--
Claim 21, Line 47, insert --and-- between "with" and "at least"

Signed and Sealed this

Twentieth Day of January, 2009

JON W. DUDAS
*Director of the United States Patent and Trademark Office*